March 20, 1934. G. N. WILLIAMS 1,951,892
METHOD AND MACHINE FOR FORMING AND TYING LOOPS IN ENDS OF
WIRES SECURED TO WIRE BOUND BOXES AND THE LIKE
Filed Feb. 4, 1933 10 Sheets-Sheet 1

INVENTOR.
George N. Williams

March 20, 1934.  G. N. WILLIAMS  1,951,892
METHOD AND MACHINE FOR FORMING AND TYING LOOPS IN ENDS OF
WIRES SECURED TO WIRE BOUND BOXES AND THE LIKE
Filed Feb. 4, 1933  10 Sheets-Sheet 10

INVENTOR.
George N. Williams.

Patented Mar. 20, 1934

1,951,892

UNITED STATES PATENT OFFICE 1,951,892

METHOD AND MACHINE FOR FORMING AND TYING LOOPS IN ENDS OF WIRES SECURED TO WIRE-BOUND BOXES AND THE LIKE

George N. Williams, Kokomo, Ind., assignor to Continental Steel Corporation, Kokomo, Ind., a corporation of Indiana Application February 4, 1933, Serial No. 655,214

14 Claims. (Cl. 140—93)

This invention relates to a method and machine for forming and securing loops in terminal ends of wires attached to, or associated with, boxes, crates, packages and the like, and in particular to wire-bound boxes.

In the carrying out of this invention, I disclose, for purposes of illustration only, a standard type of wire-bound box, composed of the separate members of a box body hingeably held together by a plurality of transversely disposed binding wires firmly attached thereto. It is understood, however, that this disclosure is not intended as a limitation as to the type of wire-bound package which may be used.

This invention has for its principal object the employment of a machine for receiving and supporting a wire-bound box, having ends or extensions of its binding wires projecting therefrom, which, when actuated, will form the projections or extensions of the wires into loops, sever any excess lengths of said projected or extended ends while forming said loops, and finally, while holding the looped wire ends against their respective wire bodies, twist the latter portions together to firmly secure said loops without breakage of said wire because of shortening during the twisting operation. Other objects of this invention will more fully appear from the following description.

That the invention may be more fully understood, reference is had to the accompanying drawings forming a part of this specification illustrating a preferred embodiment of the invention, in which:

Figure 25 is an enlarged fragmentary detailed sectional view of parts appearing in Fig. 6, being typical of all horizontal twister head mechanisms, and showing the tensioning means for the twister head shafts.

Like characters of reference denote corresponding parts throughout the figures. Also, as will presently appear, the machine comprises two units identical in operating structure, except for the size of the loops formed, each unit functioning alike and simultaneously, but on opposite ends of the respective wires. Consequently, character references referring to similar parts of each unit will be designated by adding a letter to the designating numeral of one unit, as (1, 1a), (2, 2a) and so on.

*Frame structure and lateral adjusting mechanism*

The frame support comprises webbed legs 1, the bed plates 5 and 5a, secured thereto by means of bolts 2 and 2a, and integral with legs 1, the slotted transverse members 3, said legs and bed plates being downwardly offset at one end to receive the master operating mechanism to be later described.

Figure 16:
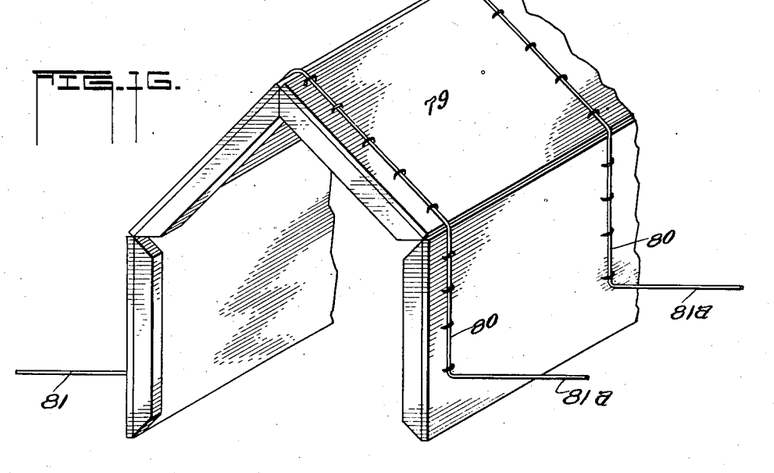
Figure 16 is a partial perspective view of a wire-bound box, partially open, showing the ends of certain binding wires bent outwardly in a horizontal position.
Figure 17:
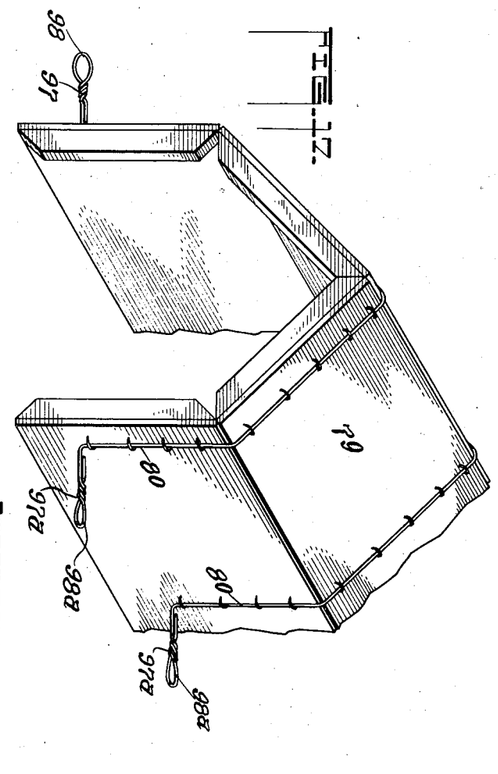
Figure 17 is a partial perspective view similar to that shown in Fig. 16, showing the ends of certain binding wires, with formed and tied loops therein.

In parallel alignment, and extending transversely to the slotted members 3 and the legs 1, are the two operating units 4 and 4a of said machine. Unit 4 through member 5 is rigidly mounted on the supporting members 1 and 3 by means of cap screws 2, but unit 4a through member 5a is adjustably mounted on said members 1 and 3 by means of cap screws 2a and is amenable to suitable lateral adjustment to allow for varying widths of the boxes. The boxes are usually hingeably constructed as shown in Figs. 16 and 17, and an initial lateral adjustment is usually all that is required for any similar groups of boxes.

Journaled to one of the supporting legs 1 at 8, and further supported by bearing 12, is the shaft 9 to which is keyed hand wheel 7. Secured to the end of shaft 9 is bevel gear 10. In meshing engagement with bevel gear 10 is bevel gear 11 keyed to shaft 13, said shaft being supportably mounted at bearings 14 and 15 secured to member 5 by means of brackets 16 and 17 respectively, and in substantially parallel alignment with units 4 and 4a. The opposite ends of shaft 13 are keyed to bevel gears 18 and 19. In meshing engagement with bevel gears 18 and 19 are miter gears 20 and 21 respectively, gear 20 being keyed to shaft 22, and gear 21 being keyed to shaft 23.

Figures 20, 21:
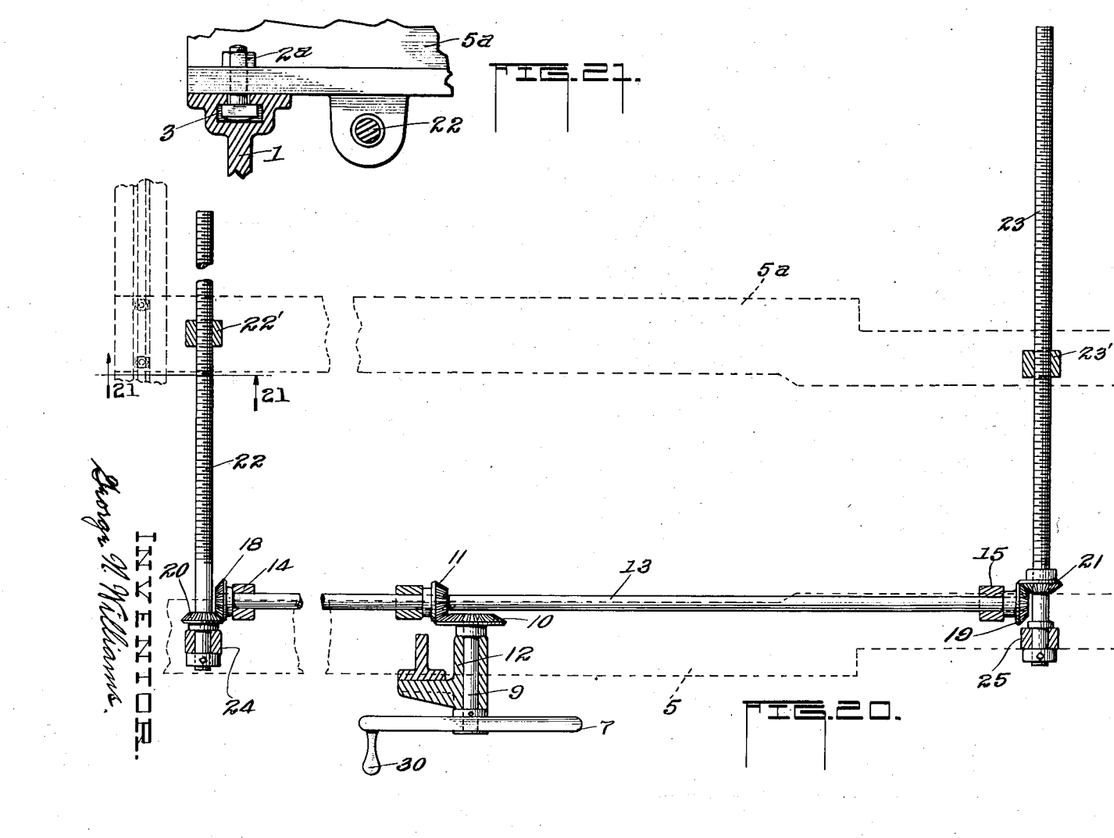
Figure 20 is a plan view of the lateral adjusting mechanism of my machine, certain parts being shown in section, as the same would appear if taken on line 20—20, Figure 2.
Figure 21 is an enlarged fragmentary view in elevation of a portion of the lateral adjusting mechanism, certain parts shown in section, as viewed along 21—21, looking in the direction of the arrows, Figure 20.

Extending transversely of units 4 and 4a are threaded shafts 22 and 23 supported in bearings 24 and 25 respectively, the latter being secured to member 5 by means of brackets 27, held by bolts 28. Threaded shafts 22 and 23 are further supported by inside threaded nuts 22' and 23' secured to member 5a. Consequently, lateral adjustment of unit 4a with respect to unit 4, best seen in Figs. 20 and 21, is obtained as follows: Securing nuts 2a are loosened and wheel 7 is turned by means of handle 30. Turning of wheel 7 rotates shaft 9 and bevel gear 10 in a direction similar to that of wheel 7, which in turn engaging pinion 11, causes shaft 13 and bevel gears 18 and 19 secured thereto, to rotate. This causes miter gears 20 and 21 to rotate and turn the threaded shafts 22 and 23 respectively, which engaging with threaded nuts 22' and 23' attached to the underside of frame 5a, causes unit 4a to move laterally, the direction of its lateral movement depending on the rotative direction of wheel 7.

When unit 4a has been positioned with respect to unit 4, securing nuts 2a are tightened and unit 4a secured against further lateral movement until said nuts are again loosened.

*Longitudinal adjustment mechanism*

Boxes of varying lengths may have a varied number of binding wires attached thereto, and the spacing of these wires may vary, although for one group of boxes the spacing of the binding wires is usually uniform; consequently, it is necessary to adjust the spacing between the various twister heads to substantially correspond to the spacing of said wires. This is done by releasing the set screws 98 and 98a, 77 and 77a, 100 and 100a, and 6 and 6a. After releasing screws 98 and 98a the spacers 101 and 101a are removed. Racks 95 and 95a are moved out of engagement with pinions 96 and 96a; spacer blocks 102 and 102a are removed and racks 89 and 89a are moved out of mesh with pinions 90 and 90a, and the looping and twisting units may then be moved into any desired position, after which the aforesaid spacer bars and racks are replaced, and the loosened screws again tightened.

*Power source and master operating mechanism*

Mounted independently of, and beneath machine members 5 and 5a, is motor 31, secured to foundation 32, by bolts 33. Also mounted in a position close to 31 and on one end of, and below members 5 and 5a, are members 38 and 38a, forming supporting means for intermittent clutch 40. Journaled in bearings 37 and 37a, mounted on members 38 and 38a is shaft 36. Keyed to said shaft 36 is driving sprocket 35.

Figure 22:
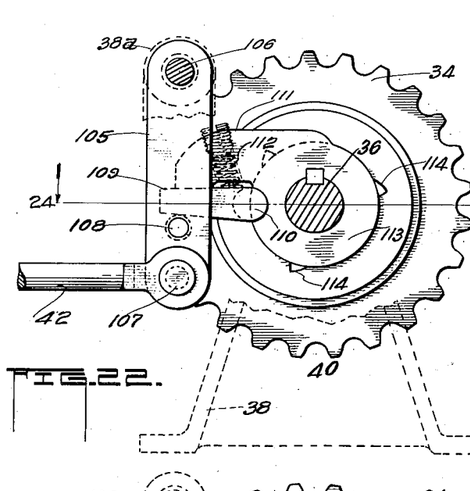
Figure 22 is an enlarged elevational view of the clutch mechanism of my machine, showing the levers in the position which they assume when the clutch members are declutched.
Figure 23:
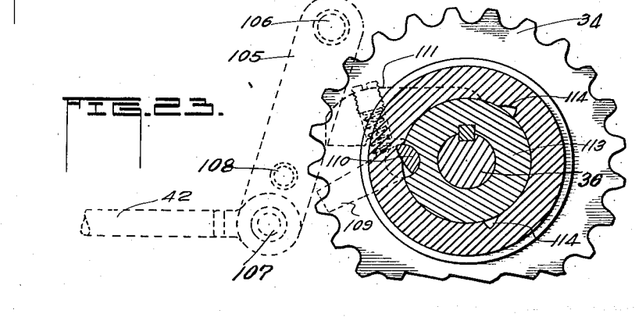
Figure 23 is an enlarged sectional view similar to Figure 22, taken on line 23—23, Fig. 24, looking in the direction of the arrows, but showing the clutch members in clutched or operative position.
Figure 24:
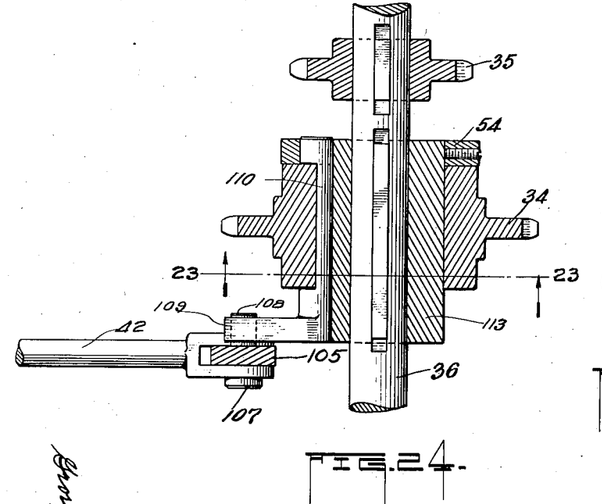
Figure 24 is an enlarged transverse section taken on line 24—24, Fig. 22, looking in the direction of the arrows, showing details of the clutch assembly.

Loosely connected to, and revolving continuously on sleeve member 113, keyed to shaft 36 is sprocket 34, connected with sprocket 48 of motor 31, through driving chain 49. Sprocket 34 is connected with clutch 40 so that when engaged by said clutch, said sprocket, through sleeve 113, engages shaft 36, and makes one revolution, thus causing sprocket 35 to make one complete revolution, and sprockets 34 and 35 then stop until sprocket 34 is again engaged. To secure the engagement of clutch 40, foot pedal 43, rockably mounted at support 44, is pressed downwardly by the machine attendant. This causes clutch lever 42, bifurcated at both its ends, and pivotally attached at one end to pedal 43 by pin 45, and at its other end to lever 105 by pin 107, to cause engagement of the intermittent clutch mechanism 40, best seen in Figs. 22, 23, and 24, the operation being as follows: At the end of clutch lever 42, opposite that of foot pedal 43 is lever 105, hingeably attached at its upper end to bracket member 38a by the pivot pin 106 and near its lower extremity to lever 42 by pivot pin 107. Positioned on lever 105 is trip pin 108, adapted, when clutch 40 is in a non-operating position as shown in Fig. 22, to prevent movement of sprocket 35, and retain the clutch operating fingers 109 and 111 in a non-operative position. Connected to the opposite end of stopping finger 109 is pawl 110 pivotably mounted in sprocket 34, sleeve 113, and retention collar 54. Secured within stopping finger 111 is adjustable spring 112 adapted to move stopping lever 109 downwardly.

As shaft 46 of motor 31 revolves continuously, this causes sprocket 34 to also revolve continuously on sleeve 113, being driven by shaft 46 through sprocket 35, and these units remain stationary until such time as clutch 40 is engaged. The actuation of foot pedal 43 moves lever 105 outwardly and moves trip pin 108 out of contact with stopping lever 109, thus allowing spring 112 to force stopping lever 109 in a downward direction when one of recesses 114 in sprocket 34 rotates to pawl 110, and causes one side of said pawl to slip into recess 114, thus connecting sprocket 34, sleeve 113, shaft 36, and causes the latter to rotate, which, in turn, causes sprocket 35 to revolve and the latter being connected to sprocket 51 by means of chain 50, causes the main drive shaft 52, to turn one complete revolution. Pin 108 through lever 105 is allowed to return to its original position after sprocket 35 has turned through approximately one-fourth of its allowed revolution. After sprocket 35 makes one complete revolution, lever 109 again engages trip pin 108, forcing pawl 110 into a non-engaging position with recess 114, and sprocket 35 ceases to rotate.

Connected with sprocket 35 through driving chain 50 is sprocket 51 keyed to shaft 52, said shaft being journaled in bearings 53 and 53a. Keyed also to shaft 52 are cams 55 and 55a, intermittent gears 56 and 56a, and 57 and 57a. The movement of said cams and gears with respect to each other is as follows: Intermittent clutch 40 is engaged, causing sprockets 34 and 35 to make one complete revolution and sprocket 35, in turn, through driving chain 50, causes sprocket 51 to make one complete revolution as has been described. Sprocket 51 being keyed to shaft 52 causes said shaft to revolve, thus causing cams 55 and 55a and intermittent gears 56 and 56a, 57 and 57a, to revolve, the direction of their revolution being that shown by the arrows in Figs. 3, 4, and 5.

Secured on studs 58 and 58a, supported in boxes 59 and 59a mounted on supporting members 60 and 60a respectively, the latter being secured to bed plates 5 and 5a by bolts 125 and 125a, are gears 61 and 61a, in meshed relation with gears 62 and 62a. The latter gears are carried respectively on shafts 63 and 63a, supported in bearings 64 and 64a, being mounted on supporting members 60 and 60a and adapted to move connecting rods 88 and 88a connected to racks 89 and 89a.

Figure 3:
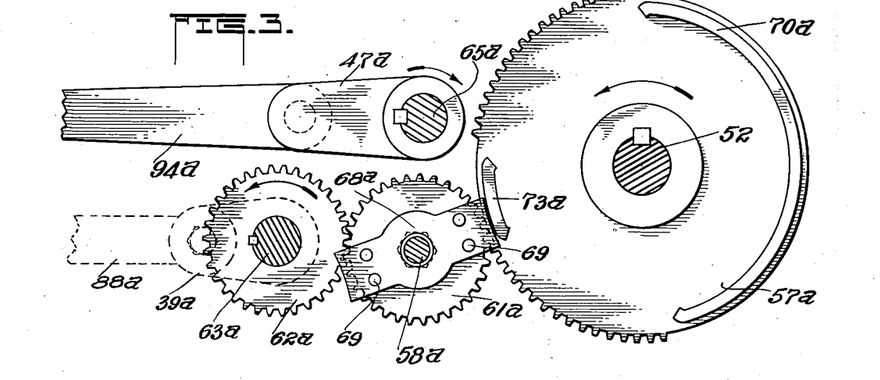
Figure 3 is an enlarged detailed sectional elevational view of one part of the transmission mechanism of my machine, as viewed along line 3—3, Fig. 1, looking in the direction of the arrows.
Figures 4, 5:
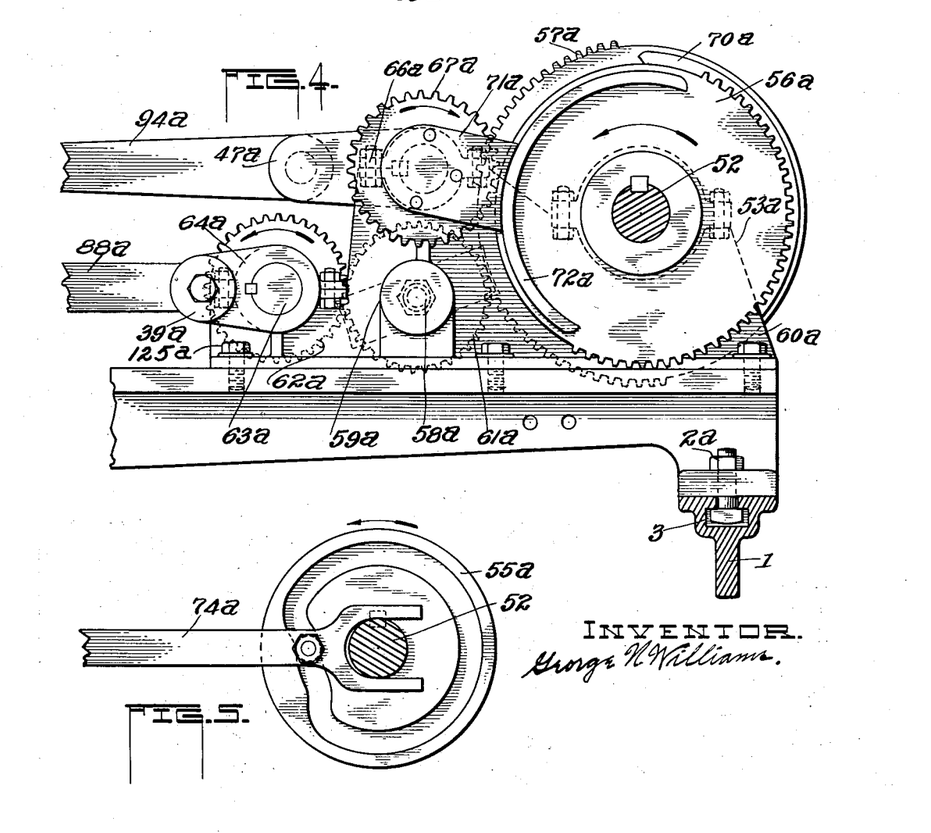
Figure 4 is an enlarged detailed elevational view of one part of my machine, as the same would appear when taken along line 4—4, Fig. 1, looking in the direction of the arrows.
Figure 5 is an enlarged detailed elevational view of one cam mechanism taken substantially along the line 5—5, Fig. 1, looking in the direction of the arrows.

Carried on shafts 65 and 65a, supported respectively by bearings 66 and 66a, in turn mounted on supporting members 60 and 60a are gears 67 and 67a. In Figs. 3, 4, and 5 the cams and gears above mentioned are shown positioned at the beginning of their cycle of operation.

After cams 55 and 55a have rotated 30 degrees, gears 57 and 57a engage gears 61 and 61a respectively, the latter being meshed with gears 62 and 62a. The latter are adapted to be rotated one-half a revolution as gears 57 and 57a revolve through 75 degrees.

Intermittent gears 57 and 57a after moving through 75 degrees, being toothless for the next 180 degrees of their revolution, cease to function and riders 68 and 68a, attached to gears 61 and 61a by rivets 69, rest on guides 70 and 70a of gears 57 and 57a during this period. Gears 56 and 56a are adapted to engage gears 67 and 67a, being so timed that this takes place during the 180 degrees toothless interval of gears 57 and 57a, and causes gears 67 and 67a to rotate one complete revolution. Gear 56 then being toothless for the next 180 degrees of its revolution, riders 71 and 71a, attached to gears 67 and 67a, ride on guides 72 and 72a of gears 56 and 56a. Gears 57 and 57a are timed so that they again engage gears 61 and 61a for 75 degrees of the revolution of gears 57 and 57a, and cause gears 61 and 61a, 62 and 62a to again rotate one-half a revolution, thus making the complete revolution for the latter gears. Gears 57 and 57a are again toothless for 30 degrees and during this period the riders 68 and 68a engage the guides 73 and 73a of gears 57 and 57a, and during this 30 degree interval the cams 55 and 55a rotate. Also during the last 60 degrees of the last mentioned 75 degrees the cams 55 and 55a return in 30 degrees and then rest 30 degrees, thus completing the cycle.

*Twisting and looping operations*

Figure 8:
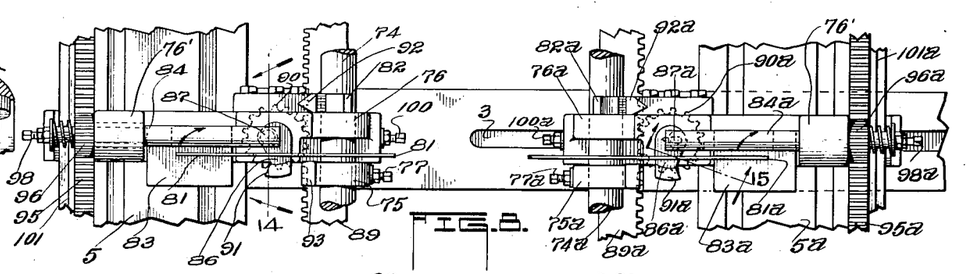
Figure 8 is an enlarged fragmentary plan view of a corresponding pair of loop forming mechanism and twister heads and adjustable supports therefor, the loop forming mechanism and twister heads being shown in their neutral or wire receiving position, as indicated in full lines, the wire to be looped being shown positioned for the first step of the loop forming operation.

Adapted to be moved by cams 55 and 55a are the pusher bars 74 and 74a, slidably mounted in bearings 115 and 115a and housings 76', carrying clamping jaws 75 and 75a, adapted to be moved forward into fairly close relationship with stops 76 and 76a. Movable jaws 75 and 75a are secured to pusher bars 74 and 74a by means of set screws 77 and 77a. This is best shown in Figs. 6 and 8.

Figure 1:
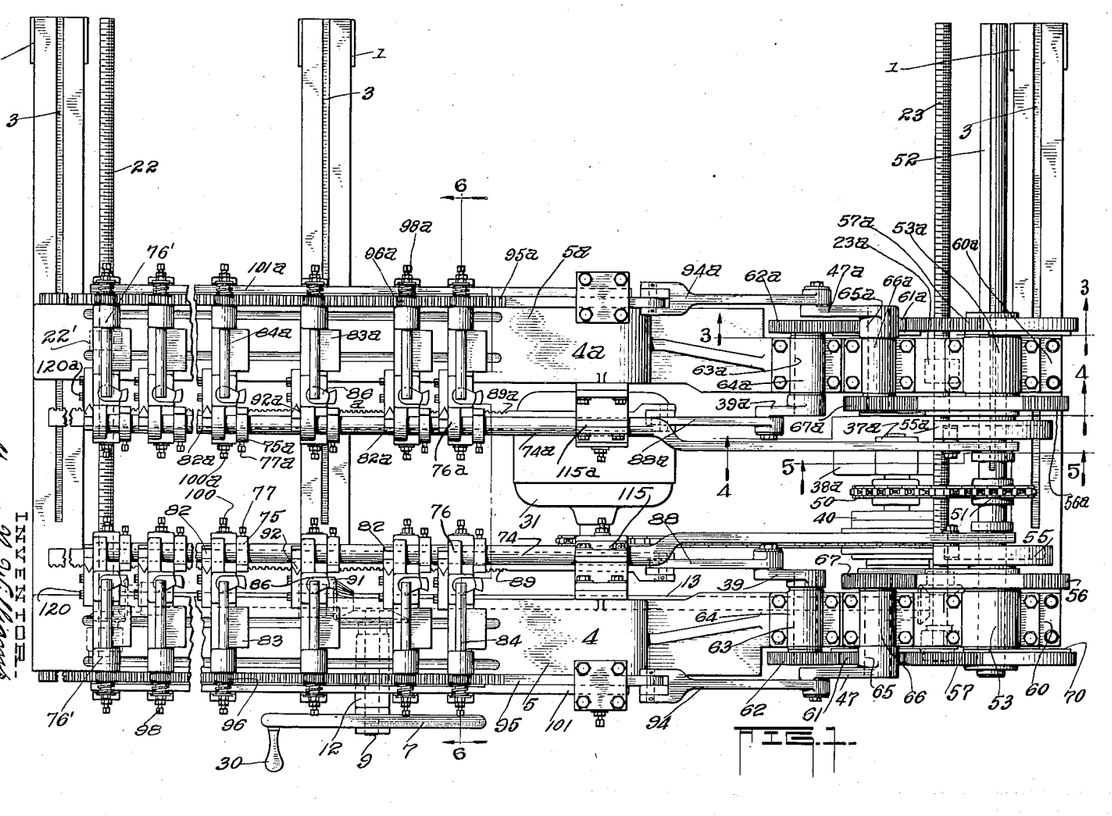
Figure 1 is a plan view of a machine embodying my invention.
Figure 2:
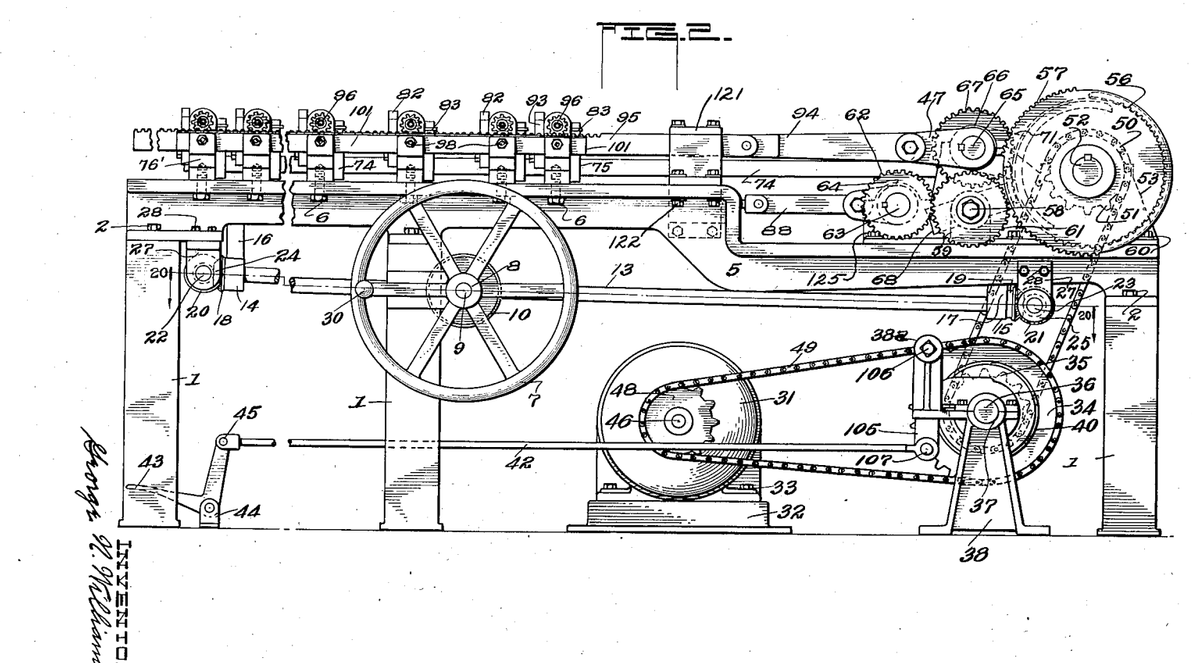
Figure 2 shows a side view of one side of my machine, showing also a side elevation of the power means used, and the arrangement of an intermittent clutch mechanism with respect thereto.
Figures 2, 6, 7:
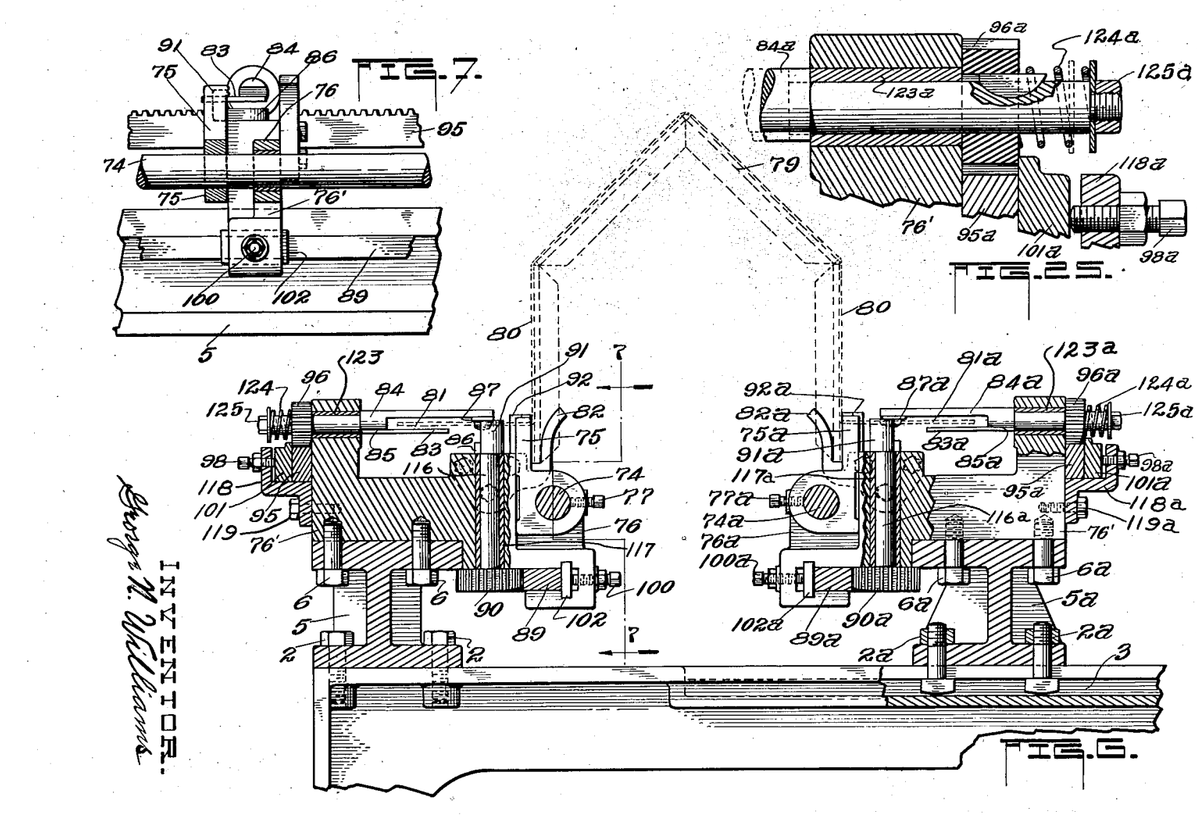
Figure 6 is an enlarged elevational view, certain parts being broken away and shown in section, as the same would appear if taken on line 6—6, Fig. 1, looking in the direction of the arrows on said figure, and shows a looper and twister means assembly, in dual arrangement; and in dotted lines a wire-bound box supported on the machine with certain wire ends of said box in initial placement with respect to certain looping and loop twisting sections.
Figure 7 is a detailed view in elevation of a part of the looping and twisting mechanism as the same would appear if taken on line 7—7, Fig. 6.

The wire-bound box 79 with the extensions of wire 80 in a horizontal position, best seen at 81 and 81a Figure 16, is placed in the machine as illustrated by dotted lines of Figure 6, the box resting in the guides 82 and 82a, attached to housings 76' by bolts 120 and 120a, which positions the box and wire extensions with respect to the machine. The wire extensions 81 and 81a then lay across aligning plates 83 and 83a, attached to twister heads 84 and 84a by suitable welds 85 and 85a. The wire extensions 81 and 81a then lay between the loop forming fingers 91 and 91a and horizontal twister heads 87 and 87a, said loop forming fingers being adapted to bend said wire ends around the horizontal twister heads 87 and 87a, certain of said heads being shown in detail in Figs. 14 and 15. All of these parts are secured to the twister head housings 76', which in turn is secured to bed plates 5 and 5a by bolts 6 and 6a, best seen in Figs. 6 and 7.

Figure 9:
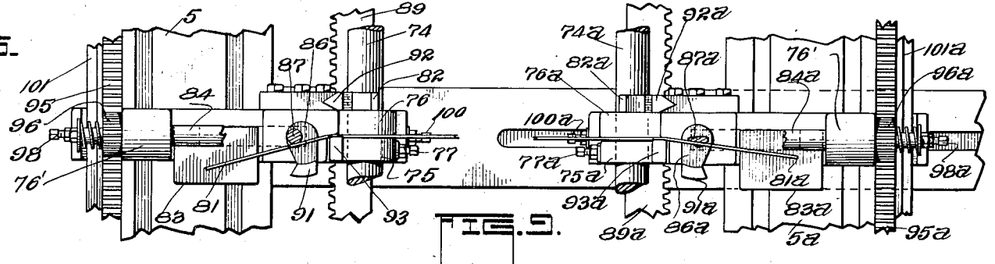
Figure 9 is a plan view similar to that shown in Figure 8, certain parts of the twisting mechanism being partially shown in dotted lines, showing a second step in the loop forming operation as indicated in full lines; the wire having been advanced by the wire shifting jaws and offset by being pressed into contact with the horizontal twister heads.
Figure 10:
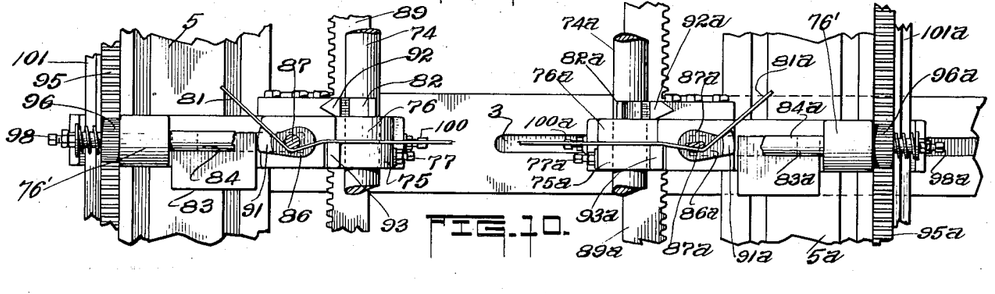
Figure 10 is a plan view similar to Figure 9 showing a third step in the loop forming operation, in which the loop forming fingers and cutters have advanced one-third of their allotted travel, causing the wire to begin looping around the horizontal twister heads.

The wire ends 81 and 81a having been positioned as described, the cams 55 and 55a in a 30 degree rotation, acting through pusher bars 74 and 74a, move jaws 75 and 75a to engage said wire extensions and position said wires against twister heads 87 and 87a, thus offsetting said extensions somewhat to form the body side of the loop, as shown in Fig. 9. After cams 55 and 55a have moved through 30 degrees, gears 57 and 57a then engage gears 61 and 61a respectively, which in turn engage gears 62 and 62a, and gears 57 and 57a in rotating through 75 degrees cause gears 62 and 62a to make one-half a revolution. The latter being affixed to shafts 63 and 63a, causes cranks 39 and 39a and links 88 and 88a, moves racks 89 and 89a, positioned and guided between short spacer bars 102 and 102a and housing 76', said racks, in turn, engaging pinions 90 and 90a, to which are secured looping fingers 91 and 91a by means of vertical shafts 116 and 116a, mounted in bearings 117 and 117a of housing 76'. The rotation of the pinions 90 and 90a causes the loop forming and cutting fingers 91 and 91a to move said wires 81 and 81a around the former heads 87 and 87a, attached to the twister heads 84 and 84a.

Figure 11:
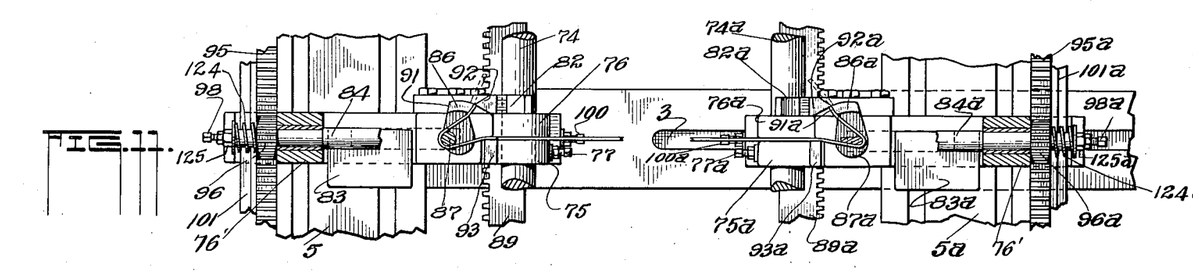
Figure 11 is a plan view similar to Figure 10, showing a fourth step in the loop forming operation, wherein the loop forming fingers and cutters have caused the wire to continue the looping action around the horizontal twister heads, the cutters having just sheared off the excess wire.

Secured to housings 76' by bolts 120 and 120a are cutter knives 92 and 92a, said knives being parts of holder units 82 and 82a, best seen in Fig. 11. The loop forming and cutting fingers 91 and 91a, forcing the wire against said cutter bars 92 and 92a, severs the excess wire, and forces the end portion of the wire forming the loop, against the main body of the wire, clamping said wire end portions against the main body of the wire at clamping jaws 93 and 93a, forming a part of shifter jaws 75 and 75a, best seen in Fig. 12.

As soon as this position has been reached gears 57 and 57a idle for 180 degrees and gears 56 and 56a engage gears 67 and 67a, causing the latter to rotate one complete revolution. Gears 67 and 67a keyed to shafts 65 and 65a, journaled in bearings 66 and 66a, causes cranks 47 and 47a to rotate one complete revolution. Said cranks, in turn, move links 94 and 94a, and racks 95 and 95a, the latter being guided in guide bearings 121 and 121a mounted on members 5 and 5a by bolts 122 and 122a, and positioned by spacer bars 101 and 101a held in flat S shaped members 118 and 118a secured to housing 76', and rotate the twister shafts 84 and 84a and twister heads 87 and 87a to form the twisted ties 97 and 97a of the loops 98 and 98a, best shown in Fig. 13. As the twisted tie is formed, shafts 84 and 84a held in normal position by springs 124 and 124a, move forward to compensate for the shortening of the wire due to the twisting and so prevents breakage of the wire. Springs 124 and 124a are held in adjustable tension by means of adjusting nuts 125 and 125a and pinions 96 and 96a.

Figure 14:
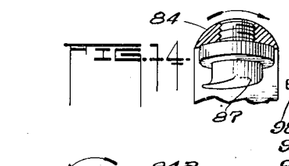
Figure 14 is a perspective view of one of the horizontal twister heads around which the large loops are formed, as the same would appear looking in the direction of the arrows, line 14—14, Fig. 8.
Figure 15:
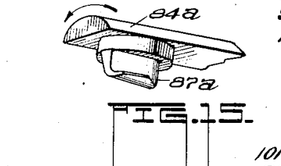
Figure 15 is a perspective view similar to that shown in Figure 14, showing one of the horizontal twister heads around which the small loops are formed, as the same would appear looking in the direction of the arrows, line 15—15, Fig. 8.

Twister heads 87 and 87a are adapted to hold the loops when rotated in the direction of the arrows, Figs. 14 and 15, and to release said loops when rotated in a reverse direction.

Then gears 57 and 57a again revolve through 75 degrees and return the loop forming fingers and cutters 91 and 91a of members 86 and 86a connected with pinions 90 and 90a by means of shafts 105 and 105a, to their original position, and cams 55 and 55a operating in a reverse direction through bars 74 and 74a release shifter jaws 75 and 75a, returning them to their original position while gear 57 is still functioning to return the loop forming and cutting fingers 91 and 91a to their original positions by a reciprocating motion of cranks 39 and 39a. Similarly shafts 84 and 84a and twister heads 87 and 87a are returned to their wire receiving positions, shafts 84 and 84a having been moved to their normal longitudinal positions by springs 124 and 124a when the loops were released from said twister heads by the return rotative movement of said shafts.

It will thus be obvious that the operation of the machine involves several steps which take place in logical sequence and continuity, each of the separate steps functioning on each of the respective wires 81 and 81a simultaneously; the master operating mechanism causing these functions to operate in unison on each unit 4 and 4a of said machine. In other words, all of the wires 81 and 81a are positioned in the units 4 and 4a as illustrated in Figure 8, so that when the bars 74 and 74a are caused to move forward, as has been described, jaws 93 and 93a push the wires 81 and 81a forward. The path of a portion of said forward moving wire being blocked by the twister heads 87 and 87a, the continued forward movement of said jaws 93 and 93a causes said wires to be offset with respect to the main wire body, each said offset wire thus being placed in contact relation with its respective twister head 87 or 87a. Consequently, since all of the jaws 93 and 93a move simultaneously as the pusher bars 74 and 74a move in unison, said jaw movement causes simultaneous movements of each of said wires 81 and 81a to said offset position as is illustrated in Figure 9. Immediately following said positioning and offsetting of all of said wires 81 and 81a the cam and gear movement, which has been described, causes the simultaneous rotation of all pinions 90 and 90a with the consequent simultaneous movement of the loop forming and cutting fingers 91 and 91a, which, moving against the wires 81 and 81a on the free end portion of said wires which extend beyond said twister heads 87 and 87a, bends each of said wire ends around its respective former head 87 or 87a, said bending movement taking place on each of said wires simultaneously, and in unison on each unit 4 and 4a. During this loop forming operation, and just prior to the time that the fingers 91 and 91a clamp the free end of the looped wire against the main wire body at clamping jaws 93 and 93a said fingers 91 and 91a forces each wire against its respective cutter knife 92 or 92a thus severing the excess wire ends and so regulating the length of the wire which is to form the loop, the movement of the wire by the fingers 91 and 91a being completed when the loop is formed and the end portion of the looped wire is clamped against the main body of the wire at clamping jaws 93 and 93a, each of said loops having thus been formed around its respective twister head 87 or 87a.

Figure 12:
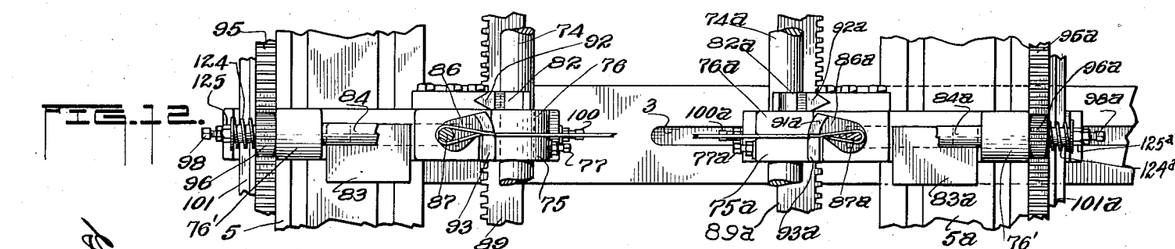
Figure 12 is a plan view similar to Figure 11, showing the next step in the operation. The loop has been completely formed, the ends of the wire have been forced into clamping contact with the main wire body, and the tension means have compressed allowing the twister shaft to move forward.

It is now obvious that the severing of the wire ends to regulate the length of the wire for forming each loop takes place simultaneously on each of the wire ends 81 and 81a, as does the clamping of said wires at the bottom of said loops to hold said loop prior to twisting the tie, thus positioning said wires 81 and 81a as illustrated in Figure 12.

Figure 13:
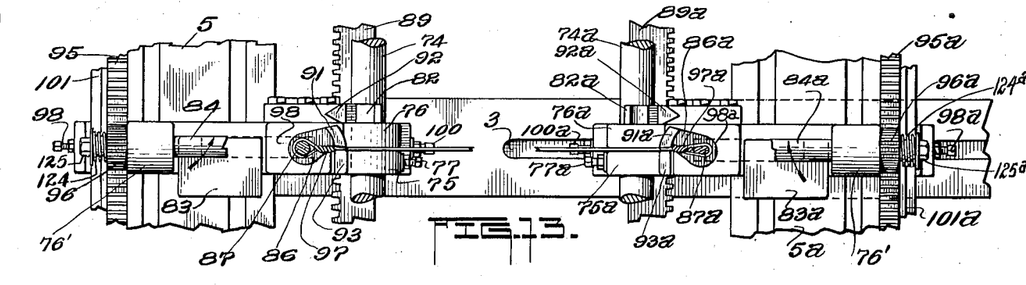
Figure 13 is a plan view similar to Figure 12, the horizontal twister heads around which the wire loops were formed having been caused to revolve in the direction indicated by the arrows, thereby twisting the looped wire to form the tied loop.

Immediately upon the wire reaching this formed and clamped position the timed gear movement, which has been previously described, causes the rotation of each twister shaft 84 and 84a and, consequently the rotation of the twister heads 87 and 87a which are attached thereto. Thus, with the wires 81 and 81a being held in the clamped position just described, the rotation of the shafts 84 and 84a causes the twisting of a tie in each of said loops as illustrated in Figure 13, said loop tie twisting operation taking place simultaneously on each of the wire ends 81 and 81a and in unison on each unit 4 and 4a.

The twisting of said loops shortens said wires and causes each of said loops to pull forward and away from said box members. Consequently, provision must be made to compensate for this shortening. This is accomplished by means of the springs 124. If a compensating device is not present and the twister shafts 84 and 84a are rigid members, then, during the twisting of said loops, the wire will either break or pull the end staples out of the box members, or both.

Each of the wires 81 and 81a now has a tied loop formed thereon said loop being positioned around its respective twister head 87 or 87a; having been tightened in said position by said twisting operation. The removal of each of said loops from each of said twister heads takes place simultaneously by causing a reverse rotation of shafts 84 and 84a, the mechanism for so doing on each unit 4 and 4a being caused to function in unison as has been described.

The twister heads 87 and 87a, best seen in Figures 14 and 15, have projections on approximately one-half thereof, somewhat similar to the bottom of the letter L, the bottom of the L being sloped or beveled downwardly, and rounded off so that when said twister heads are rotated in the direction indicated by the arrows in Figures 14 and 15 to twist said loops, the shape of the bottom of the L prevents the wire from slipping therefrom, but upon reversing the rotation of said twister heads said sloping shape allows said loop to slide therefrom, and when said loop is released, the springs 124 cause the shafts 84 and 84a with their respective twister heads 87 and 87a to move back into their normal positions for again receiving wire.

In the meantime the master operating mechanism, which has been described, causes the bars 74 and 74a to return to their initial positions and in so doing simultaneously releases each of the clamping jaws 93 and 93a. Said master operating mechanism also functions thru a reverse movement of the racks 89 and 89a and pinions 90 and 90a to return the forming fingers 91 and 91a to their initial positions.

From the foregoing it is clear that the master operating mechanism functions to cause the movement of its respective parts to act in unison on each unit 4 and 4a and by selective timing and directional movement of its parts causes the offsetting, forming, cutting, clamping, twisting and releasing operations to each take place simultaneously in its respective time interval and order, on each of said wire ends 81 and 81a.

The box 79 is then removed from the machine, the wires 80 having at their terminal ends, the loops 98 and 98a and the twisted ties 97 and 97a of said loops, illustrated in Fig. 17, another wire-bound box inserted and the operations repeated.

The wire extensions must be disposed for looping in a plane substantially 90 degrees to that of the adjacent box section, but the two units of my machine, instead of being built in a horizontal plane, may be placed one above the other in a vertical plane.

Figure 18:
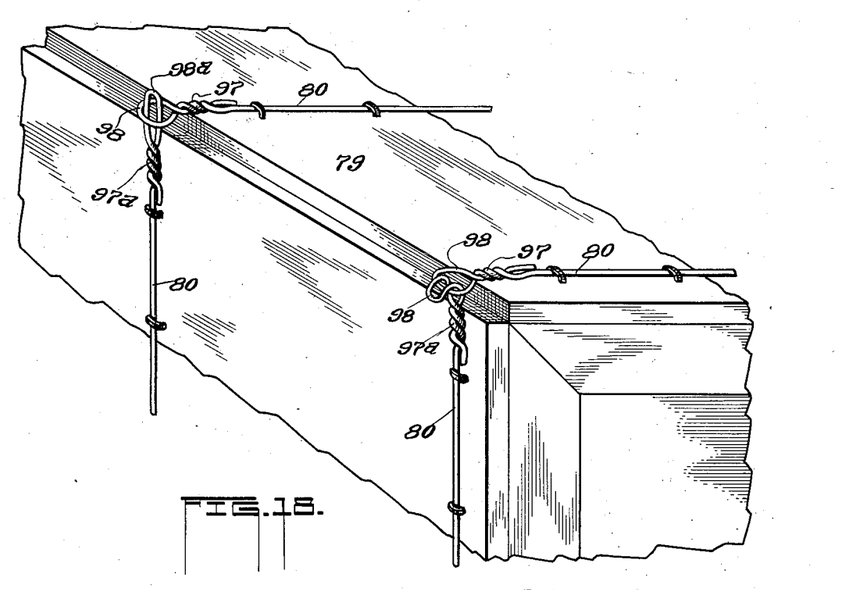
Figure 18 is an enlarged fragmentary perspective view, showing a section of a closed wirebound box with loops shown in unlocked and locked positions respectively.
Figure 19:
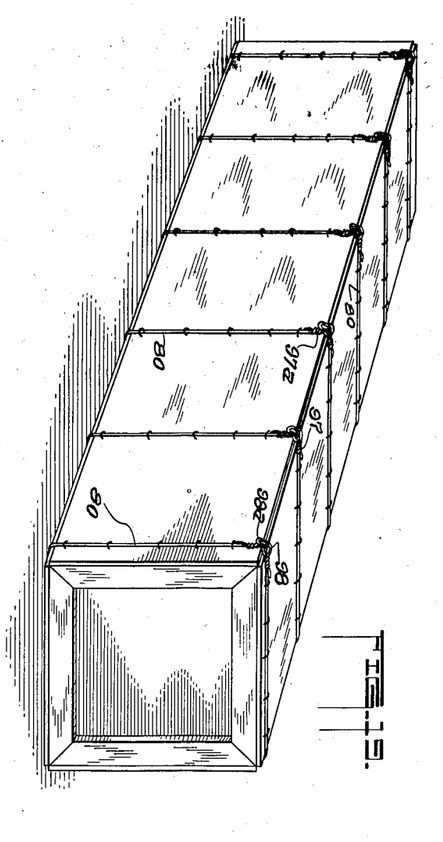
Figure 19 is a perspective view of a wire-bound box, showing the box in its closed position with the loops of the several binding wires in locked position.

In the claims reference will be made to the "forming of locking loops", and by this I mean formed loops securely tied so that one of said loops may be passed through the other of said loops, and the former when bent, will form a lock, best illustrated in Fig. 18. This locking loop, is old and I do not claim it, per se, nor do I claim the clutch mechanism, per se, which I have described and illustrated for clearness of description.

What I claim is:

1. The method of forming locking loops in ends of wires associated with wire-bound boxes having end members, comprising disposal of the wire ends in a plane substantially at right angles to said end box members, positioning said box and wire ends in a loop forming and tying machine, bending the opposite ends of each of said wires to form loops, severing the excess wire from each of said wire ends while forming said loops, holding the terminal end of each of said looped wires against their respective bodies, twisting a tie in each of said loops while so held and yieldably moving the twisting means compensatingly as the looped wire shortens, releasing said loops, returning the operating mechanism of the machine to its starting position, and removing said wire-bound box and associated locking loops from said machine.

2. In a machine for forming locking loops in ends of wires associated with wire-bound boxes and having the terminal ends of said wires disposed substantially at right angles to the end box members, in combination, means for offsetting said wire ends in contact relation with a loop former head, means for bending each of said wires to form loops while in contact with said former head, means for regulating the length of wire for each of said loops while forming said loops, means for holding each of said formed loops, means for rotating a twisting means in a direction adapted to twist a tie in each of said formed loops while so held, means associated with each of said twister means to allow sufficient movement of certain elements of said twisters to compensate for the shortening of the wire while twisting said loops, means for releasing said loops by a reverse rotation of said twisting means, and means for returning the forming and tying mechanisms of said machine to their initial position.

3. In a machine for forming locking loops in ends of wires associated with wire-bound boxes having end box members and having the ends of said wires disposed substantially at right angles to said end box members, in combination, means for simultaneously offsetting each of said wire ends in contact relation with a loop former head, means for simultaneously bending each of said wire ends around said former heads to form loops, means for simultaneously regulating the length of wire for each of said loops while forming said loops, means for simultaneously holding each of said formed loops, means for simultaneously rotating twisting means in a direction adapted to twist a tie in each of said loops while so held, means associated with each of said twisters to allow sufficient movement of certain elements of said twisters to compensate for the shortening of each of said wires while twisting each of said ties, means for releasing said tied loops by a reverse rotation of said twisting means, and means for returning the forming and tying mechanisms of said machine to their initial position.

4. In a machine for forming locking loops in the extension of opposite ends of a plurality of wires attached to hingeably associated wire-bound box members, said wire ends being disposed substantially at right angles to the respective box members adjacent thereto, in combination, means for simultaneously offsetting said wire-end extensions in contact relation with a loop former and twister head, means for simultaneously forming loops in said wire-end extensions while in contact with said former and twister heads, means for simultaneously severing the excess wire from said ends while forming said loops, means for simultaneously holding the terminal ends of said looped and severed wires against their respective wire body, compensating rotating twisting means adapted for compensative movement with respect to movement of the twister head toward and from said loops, for simultaneously twisting a tie in each of said loops while so held, and while rotating said twisting means in one direction, means for releasing said tied loops by a reverse rotative movement of said twisting means, and means for returning the forming and tying mechanisms of said machine to their initial position.

5. In a machine having positioned therein a wire-bound box with a plurality of oppositely disposed projecting wire ends, said wire ends being projected substantially at right angles to the end members of said box, in combination, means for offsetting said wire ends in contact relation with a loop former head, means for forming each of said wire ends about said former head into loops, means for severing the excess wire from each of said wires while forming said loops, and compensating twisting means for forming a twisted tie in each of said loops while rotating in one direction adapted for self-compensation with respect to the movement of certain of its parts toward and from said loops and for releasing said loops while rotating in an opposite direction, substantially as described.

6. In a machine having positioned therein a wire-bound box with a plurality of oppositely disposed projecting wire ends, said wire ends being projected substantially at right angles to said end box members, in combination, means for simultaneously offsetting said wire ends in contact relation with a loop former and twister head, means for simultaneously forming each of said wire ends about said former head into loops, means for simultaneously severing the excess wire from each of said wire ends while forming said loops, and compensating twisting means adapted for self-compensation with respect to the movement of certain of its parts towards and from said loops for simultaneously forming a twisted tie in each of said loops while rotating in one direction and releasing said loops while rotating in an opposite direction, substantially as described.

7. In a machine having positioned therein connected flat wire-bound box members having attached thereto a plurality of binding wires the opposite terminal ends of which are disposed substantially at right angles to said end members in combination, a machine means for simultaneously forming each of said wire ends into loops, simultaneously severing the excess wire from each of said wire ends while forming said loops, simultaneously holding each of said formed loops, twisting means for simultaneously twisting ties in each of said formed loops while so held, and means associated with each of said twisting means to compensate for the shortening of said wires while twisting said ties.

8. In a machine having a wire-bound box with wire ends positioned therein, said wire ends being disposed substantially at right angles to said box end members, in combination, means for forming said wire ends into loops, means for severing the excess wire from said wire ends during the formation of said loops, and self-compensating yieldable twisting means for securing said loops, substantially as described.

9. In a machine for forming locking loops in the ends of wire of hingeably associated wire-bound boxes having end members, and having said wire ends disposed in a plane substantially at right angles to that of said end box members, in combination, means for offsetting said wires in contact relation with a loop former and twister head, means for bending the wires about said head to form loops, means for regulating the length of wire for said loops, means for holding the formed loops, length-compensating twisting means for twisting ties in said loops while so held while rotating in one direction, means for releasing said looped and twisted ends by rotation in a reverse direction, means for returning the forming and twisting mechanism of said machine to its first operative position.

10. In a machine for forming locking loops in the ends of a plurality of wires of a hingeably associated wire-bound box having end members, and having said plurality of wire ends disposed in a plane substantially at right angles to that of the end box members, in combination, means for positioning and holding said box, means for adjusting the positioning and holding means with respect to the width and length of said box, means for positioning said wire ends in said machine, means adjustably adapted to receive said wire ends, means for simultaneously offsetting said wire ends in contact relation with a loop former and twister head, means for simultaneously bending each of said positioned and offset wire ends to form loops about said former and twister head, means for simultaneously severing any excess wire from each of said wire ends while forming said loops, means for simultaneously clampably holding each of said formed loops, rotative means for simultaneously twisting a tie in each of said loops while so held, means associated with each of said twisting means to allow automatic movement of certain elements of said twisting means to compensate for the shortening of each of said wires while twisting each of said ties, means for releasing each of said tied loops when said twisting means is reversably rotated, and means for returning the forming and tying mechanisms of said machine to their initial position.

11. In a machine of the character described, in combination, means to support a wire-bound box blank having wire ends disposed substantially at right angles to said box end members, said supporting means comprising dual separable units in spaced relation and adjustable toward and from each other, co-acting means on each unit adapted to offset said wire ends against a loop former and twister head, co-acting means on each unit adapted to bend the opposite ends of said offset wire about said head to form loops, co-acting means on each unit to sever any excess wire from said wire ends while forming said loops, co-acting means on each unit for clampably holding said loops, co-acting means adapted when rotating in one direction to twist a tie in each of said loops while so held, means associated with each of said twisting means to automatically compensate for the shortening of each of said wires while twisting said ties, co-acting means on each unit adapted to release said tied loops when said twisters are rotated in an opposite direction, and co-acting means for returning the loop forming and twisting mechanisms to their starting positions.

12. In a machine of the character described, in combination, mechanism for forming locking loops in opposite ends of the binding wires of a wire-bound box, comprising dual spaced supporting units adjustable toward and from each other, a series of housings on each of said units and adapted to be adjustably spaced thereon, supporting members on each of said housings, adapted, when used collectively, to support a wire-bound box therein and position opposite ends of the binding wires thereof with respect to each of said housings, a former head associated with certain parts of each of said housings and adapted to have a loop formed thereabout, means associated with each of said housings adapted to hold each of said wire ends in offset contact relation with its associated former head, a bending means mounted on each of said housings and adapted to bend said wire ends about said former heads to form loops, a cutting means mounted on each of said housings adapted to operate in conjunction with said bending means to sever any excess wire from said wire ends while forming said loops, a clamping means associated with each of said housings operating in conjunction with said bending means and adapted to hold said loops while formed about said former head, twisting means mounted on each of said housings, and having said former heads integral therewith, adapted while rotating in one direction to twist a tie in each of said loops while so held, a means forming a part of said twister means adapted to allow yieldable movement of part of said twister means to compensate for the shortening of each of said wires while being twisted, means for releasing said loops from said former head by a reverse rotation of said twister means and while returning said mechanism to its initial position.

13. In a machine of the character described a mechanism for forming locking loops in opposite ends of a plurality of binding wires of a wire-bound box, comprising dual spaced supporting units adjustable toward and from each other, a series of housings on each of said units and adapted to be adjustably spaced thereon, supporting members on each of said housings adapted when used collectively to hold a wire-bound box therein and to oppositely position said binding wire ends with respect to each of said housings; a wire offsetting jaw adjustably mounted on a bar adapted to move in guides associated with each of said housings; a vertical shaft mounted in each of said housings, having a pinion on one of its ends engaged in meshing relation with a rack bar common to all corresponding pinions of each of said units, and a wire bending member on its opposite end adapted to bend its respective offset wire end to form a loop; a cutter means mounted on each of said housings and adapted to be engaged by said bending member to sever any excess wire from said wire ends; a horizontal shaft yieldably mounted for longitudinal movement on each of said housings having on one of its ends a pinion engaged in meshing relation with a rack bar common to all corresponding pinions of each of said units, and on its opposite end a former head, said former head adapted to have said loop formed thereabout by said bending means; a stop associated with each of said housings, and adapted in conjunction with said loop bending member to act as a loop holding means; a selective setting means for actuating in predetermined sequence, amount and direction of movement; said offsetting means, said bending means, said wire severing means, said self-compensating twisting means, said loop releasing means and means for returning all of said means to their initial positions, said selective means comprising means for actuating said wire offsetting jaw bars on each of said units to offset said wire ends in unison and return said bars in unison to an initial position, means for actuating rack bars meshed with pinions attached to said vertical shafts of each of said units and adapted to impart rotative motion thereto to bend in unison said loops, sever any excess wire therefrom during said bending, and return said bending mechanism in unison to an initial position, means for actuating rack bars meshed with pinions attached to said horizontal shafts of each of said units and adapted to impart rotative motion thereto for twisting a tie in said looped wires, said shafts being yieldably mounted in said housings to allow automatic compensative longitudinal movement thereof while rotating therein, means for releasing said loops while returning the machine mechanism to its initial box receiving position.

14. In a machine of the character described, in combination, mechanism for forming locking loops on opposite ends of wires associated with a wire-bound box, comprising means for forming loops in the ends of said wires, means for twisting a tie in each of said loops and self-compensating means associated with said twisting means adapted to permit compensating yieldable movement of certain elements of said twisters while twisting said ties.

GEORGE N. WILLIAMS.